(No Model.)

I. J. WILSON.
SHAFT COUPLING AND CYCLE HANGER.

No. 599,434.  Patented Feb. 22, 1898.

WITNESSES:  INVENTOR
J. P. Evans.  Ira J. Wilson
D. G. Jones.

UNITED STATES PATENT OFFICE.

IRA J. WILSON, OF PITTSBURG, PENNSYLVANIA.

SHAFT-COUPLING AND CYCLE-HANGER.

SPECIFICATION forming part of Letters Patent No. 599,434, dated February 22, 1898.

Application filed October 11, 1895. Serial No. 565,352. (No model.)

*To all whom it may concern:*

Be it known that I, IRA J. WILSON, a citizen of the United States, residing at Pittsburg, in the county of Allegheny and State of Pennsylvania, have made a new and useful Improvement in Shaft-Couplings and Cycle-Hangers, all of which will be readily understood from the following description, taken in connection with the accompanying drawings, wherein—

Figure 1:
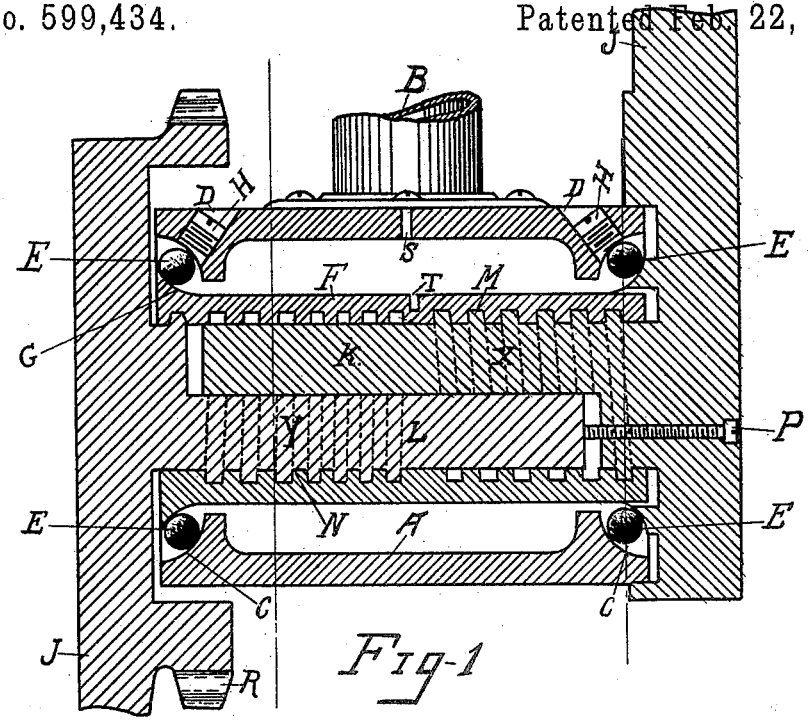
Figures 2, 3:
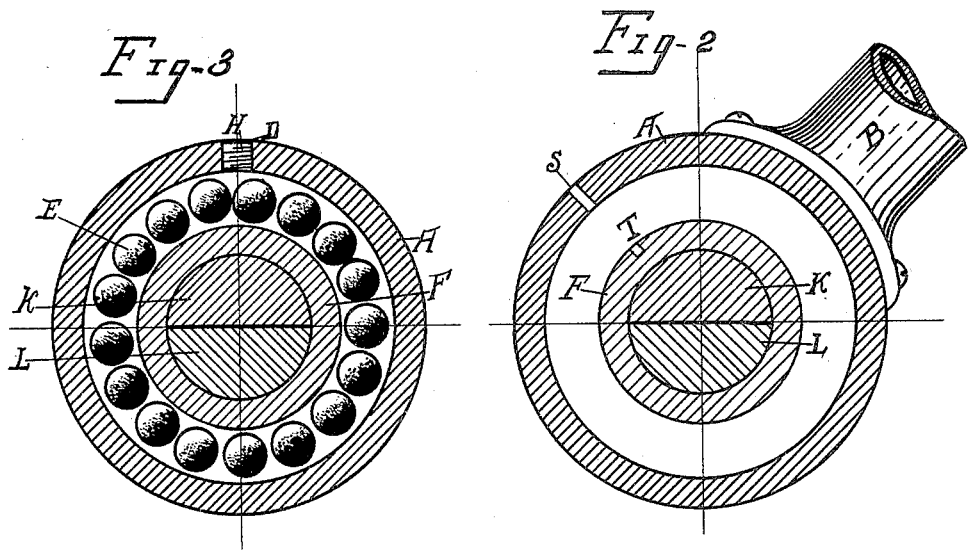

Figure 1 represents a longitudinal vertical section of my improved crank-axle, coupling, and hanger as applied to a cycle-frame; Fig. 2, a transverse middle section of the same; Fig. 3, transverse vertical section near the end of the hanger, showing the several inclosed parts.

For the purposes of my invention and to give it bodily form I use a hollow hanger A of suitable length and diameter and rigidly secure the same in proper position to a supporting-frame B. Each end of said hanger is provided with an inwardly-directed circular flange C, which is concavely curved outward. Concentrically within the hanger A is arranged a revoluble tubular coupling or sleeve F, thickened at one end to form a concaved circumferential shoulder G, which is less in diameter than the inwardly-directed flanges C of the hanger, leaving between their concaved surfaces a suitable annular raceway for a sufficient number of interposed antifriction-balls E, which are introduced through holes or openings D in the hanger, and to prevent the casual displacement of said balls each hole is closed by a suitable plug H. These balls constitute bearing-points between the hanger and sleeve, serving to diminish frictional wear and preclude endwise movement between the sleeve and hanger. The interior surface of the sleeve F is provided with a right-hand screw M, extending a suitable distance from one end toward the middle portion, and a left-hand screw N, extending from the opposite end inwardly an equal distance. The shaft is composed of two semicylindrical parts K L, each provided with a crank-arm J, attached thereto or integral therewith. The two sections comprising the shaft when placed together, so that their parallel divisible surfaces shall be in close contact within the sleeve, form a compound cylindrical body of great strength. Around the semicircular surface of one section of the shaft nearest its crank-arm is formed square right-hand male screw-threads X, adapted to engage one-half of the corresponding screw M in the sleeve F, and the adjoining other section of the shaft is in like manner provided with similarly-shaped left-hand male screw-threads Y, adapted to engage one-half of a corresponding screw N in the opposite end of the sleeve. The curved portion of each semicylindrical shaft-section extending inwardly beyond its screw is perfectly plain and of less diameter than the circumferential surface of the screw-thread.

Through one of the crank-arms is a small set-screw P, arranged to press directly against the end of the shaft-section nearest thereto, and thereby limit its movement in that direction and consequent movement of the adjoining section in an opposite direction. The other crank-arm is provided with a sprocket-wheel R, which may be of any suitable construction and dimensions.

In placing the several parts in relative working position the sleeve is concentrically arranged within the hanger and one end of a stout wire passed through a small hole S in the hanger and into a notch T in the sleeve to temporarily prevent its rotation, or the sleeve may be held by any means in practice more convenient or expeditious. The shaft-sections K L are then introduced into their respective ends or opposite ends of the sleeve and in such relative positions as that their ends shall overlap and the parallel divisible contact-surfaces slide upon each other. By rotating either of these shaft-sections both will revolve, and if rotation be continued in a proper direction the screw-threads thereon will engage their counterparts within the sleeve, whereby the shaft-sections will simultaneously be drawn inward, and as their ends overlap the parallel divisible surfaces are brought in close sliding contact, advancing in reverse directions until the smooth semicircular portion of each section slides upon and over an equal surface of the screw-threads in the opposite end of the sleeve, whereby only one half of each screw in the sleeve is permanently engaged with the corresponding screw-threads on that sectional part of the shaft-axle, the other half being in close contact with the solid smooth semicircular portion of the other section of the shaft, which rests upon the threads of said screw without engagement therewith.

The inward movement of the shaft-sections is limited by the set-screw P and by it may be jammed and tightly locked within and to the sleeve, causing it to rotate with the shaft.

If the balls or parts between which they are interposed become unduly worn, the set-screw may be turned outwardly, permitting the shaft-sections to be moved inward and correct injurious looseness.

In the foregoing specification I have described my invention as applied to the frame of an ordinary cycle. It is obvious, however, that my improved coupling is suitable for other than cycle-shafts, in which case the cranks, antifriction-balls, and hollow hanger may be dispensed with, and various appendages and appliances may be used in connection with my improved shaft and coupling device without alteration of its essential features or design.

Having thus described my invention, I claim—

1. A compound shaft and coupling therefor, consisting of a tubular sleeve which has a right-hand screw in one end, a left-hand screw in its opposite end, a neutral portion between said screws, in combination with an inclosed shaft composed of two semicylindrical sections, a screw terminating in the arc of a circle on that part of each section last entering the sleeve, and a plain extended portion of each section resting in close sliding contact upon the reverse screw-threads in the opposite ends of the sleeve.

2. In a compound shaft and coupling, the combination consisting of a sleeve which has reverse screw-threads in opposite ends thereof, a shaft composed of two semicylindrical sections in close overlapping contact a greater portion of their length, a screw terminating in the arc of a circle on that part of each section last entering the sleeve, a smooth unthreaded portion of each section extending inwardly and resting in close contact upon the screws in the opposite end of the sleeve and upon the flat surface of the adjoining section diametrically opposite its threaded portion.

3. In a compound shaft and coupling the combination consisting of a sleeve, reverse screw-threads in opposite ends thereof, a shaft composed of two uniform semicylindrical sections, a screw terminating in the arc of a circle on that part of each last entering the sleeve, a smooth unthreaded portion of each section that extends through an otherwise unoccupied space at the opposite end of the sleeve.

4. A cylindrical axle composed of two semicylindrical portions a crank-arm on one end of each, right-hand screw-threads on the curved surface of one semicylindrical portion of the axle, left-hand screw-threads on the curved surface of the other semicylindrical portion; in combination with a closely-fitting revoluble sleeve which has interior right and left hand screws for engagement of the threads on the shaft portions, a set-screw for adjusting the inward movement of the sectional axle within the sleeve, a hanger around the sleeve; raceways between the hanger and sleeve; suitable holes or openings through the hanger for the introduction of antifriction-balls into said raceways, and a screw plug or stopper as a means for closing said holes or openings in the hanger to prevent casual displacement of the balls.

In testimony whereof I affix my signature in presence of two witnesses.

IRA J. WILSON.

Witnesses:
EDWIN A. HENRY,
OLIVER R. JOHNSTON.